United States Patent [19]

Kastelic et al.

[11] 4,395,307

[45] Jul. 26, 1983

[54] THERMOTROPIC LIQUID CRYSTAL POLYMER PULP AND METHOD OF PREPARATION THEREOF WHEREIN SAID POLYMER COMPRISES RECURRING UNITS WHICH CONTAIN A 2,6-DIOXYANTHRAQUINONE MOIETY

[75] Inventors: John R. Kastelic, Rockaway; Larry F. Charbonneau, Chatham; Thomas P. Carter, Jr., Parsippany, all of N.J.

[73] Assignee: Celanese Corporation, New York, N.Y.

[21] Appl. No.: 319,521

[22] Filed: Nov. 9, 1981

[51] Int. Cl.$^3$ .............................................. D21F 11/00
[52] U.S. Cl. .................... 162/157.3; 264/140; 264/141; 264/143
[58] Field of Search ............... 162/146, 157 R; 264/143, 176 F, 140, 141; 528/127

[56] References Cited

U.S. PATENT DOCUMENTS

| | | | |
|---|---|---|---|
| 2,988,782 | 6/1961 | Guandique et al. | 162/157 R |
| 2,999,788 | 9/1961 | Morgan | 162/157 R |
| 3,080,272 | 3/1963 | Jackson | 162/157 R |
| 3,101,294 | 8/1963 | Fridrichsen | 162/146 |
| 3,920,507 | 11/1975 | Yonemori | 162/157 R |
| 3,975,487 | 8/1976 | Cottis et al. | 264/210 F |
| 4,054,625 | 10/1977 | Kozlowski et al. | 162/157 R |
| 4,066,620 | 1/1978 | Kleinschuster et al. | 264/176 R |
| 4,183,895 | 1/1980 | Luise | 264/34 S |
| 4,194,040 | 3/1980 | Breton et al. | 428/308 |
| 4,247,514 | 1/1981 | Luise | 264/34 S |

FOREIGN PATENT DOCUMENTS 22182  1/1981  European Pat. Off. .

OTHER PUBLICATIONS

Glen, "Papers from Synthetic Fibers", *Paper Tech.*, vol. 5, No. 2 (1964), pp. 137–142.

*Primary Examiner*—Peter Chin
*Attorney, Agent, or Firm*—Burns, Doane, Swecker & Mathis

[57] ABSTRACT

A novel pulp is provided comprised of fibrils of a thermotropic liquid crystal polymer which comprises recurring units which contain a 2,6-dioxyanthraquinone moiety. Materials comprised of thermotropic liquid crystal polymers which contain such a moiety are readily broken up to form a pulp comprised of fibrils which can be incorporated into a variety of articles such as papers.

18 Claims, No Drawings

THERMOTROPIC LIQUID CRYSTAL POLYMER PULP AND METHOD OF PREPARATION THEREOF WHEREIN SAID POLYMER COMPRISES RECURRING UNITS WHICH CONTAIN A 2,6-DIOXYANTHRAQUINONE MOIETY

CROSS-REFERENCE TO RELATED APPLICATIONS

This application is related to U.S. patent applications (1) Ser. No. 319,525, filed Nov. 9, 1981, of Alan Buckley and Gordon W. Calundann entitled "Non-Woven Articles Comprised of Thermotropic Liquid Crystal Polymer Fibers;" (2) Ser. No. 319,524, filed Nov. 9, 1981, of Alan Buckley, Gordon W. Calundann and John R. Kastelic entitled "High Performance Papers Comprised of Fibrils of Thermotropic Liquid Crystal Polymers;" and (3) Ser. No. 319,522, filed Nov. 9, 1981, of Alan Buckley, Gordon W. Calundann and John R. Kastelic entitled "Thermotropic Liquid Crystal Polymer Pulp and Method of Production Thereof."

BACKGROUND OF THE INVENTION

The present invention is directed to a pulp comprised of fibrils of thermotropic liquid crystal polymers.

Various articles such as papers comprised of polymeric materials have been employed for many purposes. For example, such structures have been employed as filters and electrical insulation, etc. However, such articles are frequently not appropriate for use in a high temperature environment (e.g., temperatures in excess of about 200° C.) or in an environment where the structure will come into contact with corrosive chemicals or solvents. It is therefore desirable to provide articles comprised of a polymeric material which is resistant to solvents or corrosive chemicals and suitable for use at high temperatures.

It has been recently found that thermotropic liquid crystal polymers can be advantageously used in non-woven articles and papers to impart the desired thermal and chemical resistance thereto. See, for example, the above-referenced related U.S. Patent applications (1) and (2).

As noted in the above-referenced application (3), a pulp comprised of fibrils of thermotropic liquid crystal polymers can be provided by masticating various articles comprised of such polymers. While such articles can be broken up without too much difficulty due to the high degree of orientation of the polymer within the article, it has been found that a significant amount of time and energy is frequently required to provide a pulp comprised of submicron size particles (e.g., fibrils) of thermotropic liquid crystal polymers.

It is therefore desirable to provide a thermotropic liquid crystal polymer which can readily be broken up into submicron size particles to form a pulp suitable for use in articles such as papers.

It is also desirable to provide a method by which a thermotropic liquid crystal polymer can be readily broken up into submicron size particles to provide a pulp suitable for use in articles such as papers.

It is also known to those skilled in the art that the heat treatment of shaped articles of liquid crystal polymers increases the melting temperature, molecular weight and mechanical properties of the polymer. See, for example, U.S. Pat. Nos. 3,975,487; 4,183,895; and 4,247,514.

OBJECTS AND SUMMARY OF THE INVENTION

It is therefore an object of the present invention to provide a method by which a thermotropic liquid crystal polymer can be readily broken up into submicron size particles.

It is also an object of the present invention to provide a pulp produced by such a method.

In accordance with one aspect of the present invention, there is thus provided a method for providing a pulp comprised of fibrils of a polymer which exhibits desirable thermal stability and chemical and solvent resistance comprising the steps of:

providing a shaped article comprised of a polymer capable of forming an anisotropic melt phase which comprises not less than about 5 mole percent of recurring units which include a 2,6-dioxyanthraquinone moiety; and masticating said shaped article to form fibrils comprised of said polymer.

In accordance with another aspect of the present invention, there is provided a pulp comprised of fibrils of a polymer which is capable of forming an anisotropic melt phase and which comprises not less than about 5 mole percent of recurring units which include a 2,6-dioxyanthraquinone moiety.

DETAILED DESCRIPTION OF THE INVENTION

Thermotropic liquid crystal polymers are polymers which are liquid crystalline (i.e., anisotropic) in the melt phase. These polymers have been described by various terms, including "liquid crystalline," "liquid crystal" and anisotropic." Briefly, the polymers of this class are thought to involve a parallel ordering of the molecular chains. The state wherein the molecules are so ordered is often referred to either as the liquid crystal state or the nematic phase of the liquid crystal material. These polymers are prepared from monomers which are generally long, flat and fairly rigid along the long axis of the molecule and commonly have chain-extending linkages that are either coaxial or parallel.

Such polymers readily form liquid crystals (i.e., exhibit anisotropic properties) in the melt phase. Such properties may be confirmed by conventional polarized light techniques whereby crossed polarizers are utilized. More specifically, the anisotropic melt phase may be confirmed by the use of a Leitz polarizing microscope at a magnification of 40× with the sample on a Leitz hot stage and under nitrogen atmosphere. The polymer is optically anisotropic; i.e., it transmits light when examined between crossed polarizers. Polarized light is transmitted when the sample is optically anisotropic even in the static state.

These thermotropic liquid crystal polymers suitable for use in the present invention are those polymers which comprise not less than about 5 mole percent of recurring units which include a 2,6-dioxyanthraquinone moiety. Such polymers may include but are not limited to wholly aromatic polyesters, aromatic-aliphatic polyesters, aromatic polyazomethines, wholly and non-wholly aromatic poly(ester-amide)s and aromatic polyestercarbonates. Recurring units which contain the 2,6-dioxyanthraquinone moiety are preferably present in amounts ranging from about 5 to about 25 mole percent, and most preferably, from about 5 to about 15 mole percent.

The wholly aromatic thermotropic liquid crystal polymers are comprised of moieties which contribute at least one aromatic ring to the polymer backbone and which enable the polymer to exhibit anisotropic properties in the melt phase. Such moieties include but are not limited to aromatic diols, aromatic amides, aromatic diacids and aromatic hydroxy acids. Moieties (in addition to 2,6-dioxyanthraquinone) which may be present in the thermotropic liquid crystal polymers employed in the present invention (wholly or non-wholly aromatic) include but are not limited to the following:

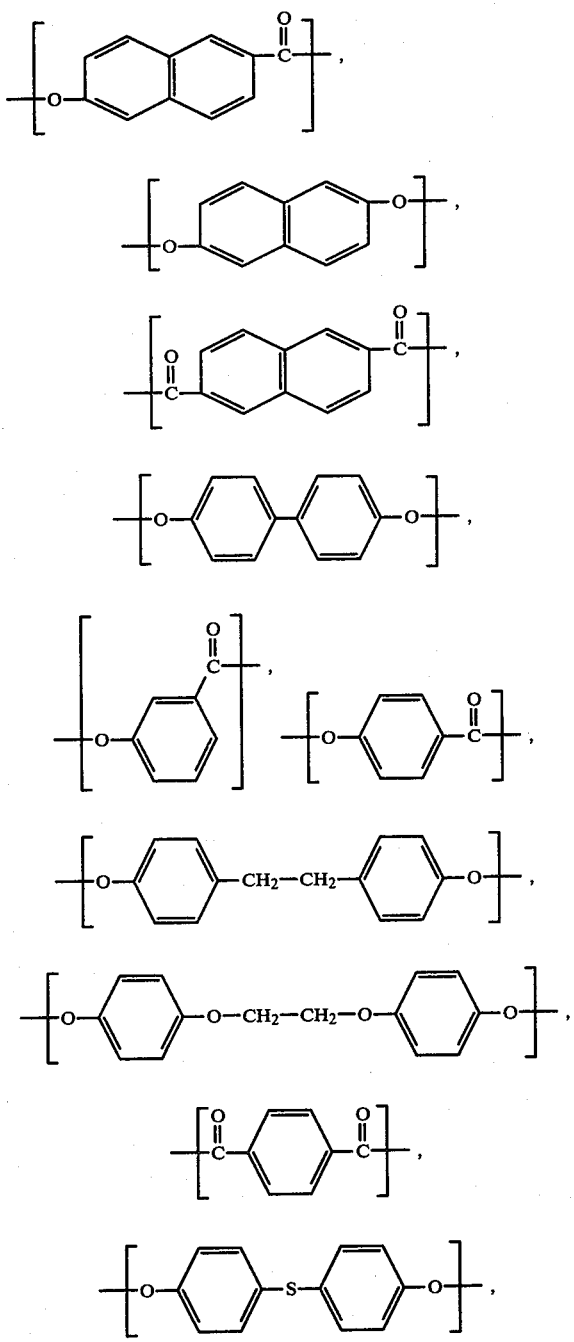

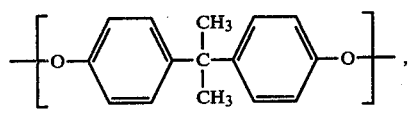

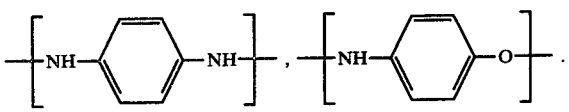

Wholly aromatic polymers which are preferred for use in the present invention include wholly aromatic polyesters and poly(ester-amide)s which are disclosed in commonly-assigned U.S. Pat. No. 4,224,433 and U.S. Pat. No. 4,341,688. Additional wholly aromatic polyesters which are suitable for use in the present invention are disclosed in U.S. Pat. No. 4,188,476. The disclosures of all of the above-identified U.S. patents and applications are herein incorporated by reference in their entirety.

The wholly aromatic polymers including wholy aromatic polyesters and poly(ester-amide)s which are suitable for use in the present invention may be formed by a variety of ester-forming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as said polymer particles are suspended therein. A vacuum may be applied to facilitate removal of volatiles formed during the final stage of the condensation (e.g., acetate acid or water).

Commonly-assigned U.S. Pat. No. 4,083,829, entitled "Melt Processable Thermotropic Wholly Aromtic Polyester," describes a slurry polymerization process which may be employed to form the wholly aromatic polyesters which are preferred for use in the present invention. According to such a process, the solid product is suspended in a heat exchange medium. The disclosure of this patent is herein incorporated by reference in its entirety.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The aromatic polymers suitable for use in the present invention tend to be substantially insoluble in common solvents and accordingly are not susceptible to solution processing. As discussed previously, they can be readily processed by common melt processing techniques. Most suitable wholly aromatic polymers are soluble in pentafluorophenol to a limited extent.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic poly(ester-amide)s which are preferred commonly exhibit a molecular weight of about 5000 to 50,000 and preferably about 10,000 to 30,000; e.g., 15,000 to 17,000. Such molecular weight may be determined by gel permeation chromatography as well as by other standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters and poly(ester-amide)s additionally commonly exhibit an inherent viscosity (i.e., I.V.) of at least approximately 1.0 dl./g., e.g., approximately 1.0 to 10.0 dl./g., when dissolved in a concentration of 0.1 percent by weight in pentafluorophenol at 60° C.

Especially preferred wholly aromatic polymers are those which are disclosed in above-noted U.S. Pat. No. 4,224,433 and in U.S. Pat. No. 4,341,688.

For the purpose of the present invention, the aromatic rings which are included in the polymer backbones of the polymer components employed in the present invention may include substitution of at least some of the hydrogen atoms present upon an aromatic ring. Such substituents include alkyl groups of up to four carbon atoms; alkoxy groups having up to four carbon atoms; halogens; and additional aromatic rings, such as phenyl and substituted phenyl. Preferred halogens include fluorine, chlorine and bromine. Although bromine atoms tend to be released from organic compounds at high temperatures, bromine is more stable on aromatic rings than on aliphatic chains, and therefore is suitable for inclusion as a possible substituent on the aromatic rings.

The polyester disclosed in U.S. Pat. No. 4,224,433 is a melt processable wholly aromatic polyester which is capable of forming an anisotropic melt phase at a temperature below approximately 375° C. The polyester consists essentially of the recurring moieties I, II and III wherein:

I is

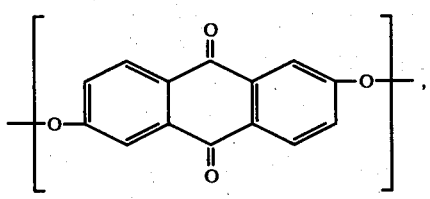

II is

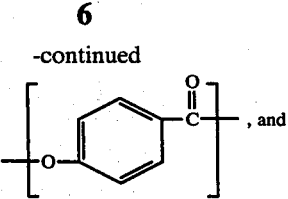

, and

III is a dicarboxy aryl moiety of the formula

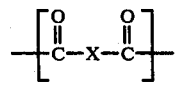

where X is selected from at least one member of the group consisting of (a) 1,3-phenylene radicals which optionally are replaced with up to 75 mole percent of 1,4-phenylene radicals based upon the total concentration of 1,3-phenylene and 1,4-phenylene radicals present in the polyester, (b)

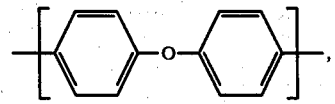

, (c)

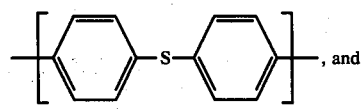

, and (d)

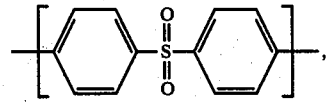

, and wherein the polyester comprises approximately 15 to 30 mole percent of moiety I, approximately 35 to 70 mole percent of moiety II, and approximately 15 to 30 mole percent of moiety III, and wherein at least some of the hydrogen atoms present upon the rings optionally may be replaced by substitution selected from the group conisting of an alkyl group of 1 to 4 carbon atoms, an alkoxy group of 1 to 4 carbon atoms, halogen, phenyl, substituted phenyl and mixtures thereof.

U.S. Pat. No. 4,341,688 discloses a melt processable poly(ester-amide) capable of forming an anisotropic melt phase at a temperature below approximately 400° C. consisting essentially of recurring moieties I, II, III, and IV wherein:

I is

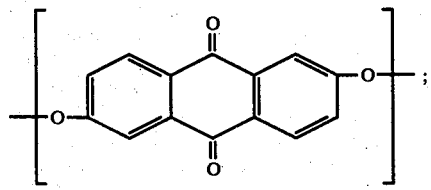

;

II is

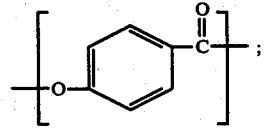

;

III is 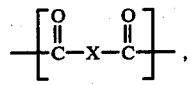

where X is selected from at least one member of the group consisting of (a) 1,3-phenylene radicals which optionally are replaced with up to 75 mole percent of 1,4-phenylene radicals based upon the total concentration of 1,3-phenylene and 1,4-phenylene radicals present in moiety III, (b) 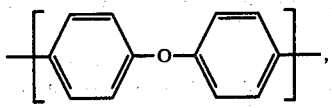

(c) 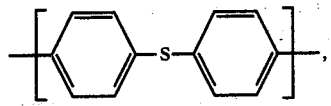

(d) 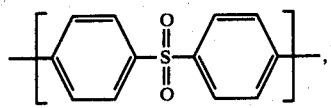

(e) 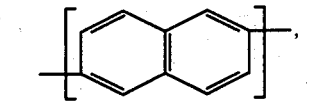

(f) 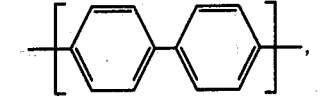

(g) 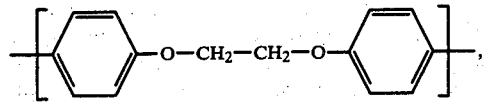

(h) a divalent aliphatic carbocyclic radical, and
(i) mixtures of the foregoing; and IV is $+Y-Ar-Z+$, where Ar is a divalent radical comprising at least one aromatic ring, Y is O, NH, or NR, and Z is NH or NR, where R is an alkyl group of 1 to 6 carbon atoms or an aryl group, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl and mixtures thereof, and wherein moiety I is present in a concentration within the range of approximately 5 to 35 mole percent, moiety II is present in a concentration within the range of approximately 20 to 80 mole percent, moiety III is present in a concentration within the range of approximately 10 to 40 mole percent, and moiety IV is present in a concentration within the range of approximately 5 to 35 mole percent, with the total molar concentration of moieties I and IV being substantially equal to the molar concentration of moiety III. Preferably, moiety I is present in a concentration in the range of approximately 5 to 30 mole percent, moiety II is present in a concentration in the range of approximately 30 to 70 mole percent, and moiety III is present in a concentration in the range of approximately 15 to 35 mole percent.

The pulp of the present invention is comprised of fibrils of thermotropic liquid crystal polymers (i.e., polymers which are capable of forming an anisotropic melt phase) and which comprise not less than about 5 mole percent of recurring units which include a 2,6-dioxyanthraquinone moiety. It has been surprisingly and unexpectedly found that fibrils of submicron size can be obtained from thermotropic liquid crystal polymers which contain the 2,6-dioxyanthraquinone moiety with significantly less energy input and over a shorter period of time than is required when fibrils are produced from thermotropic liquid crystal polymers which do not contain such a moiety.

The fibrils may be produced by several methods including mechanically masticating shaped articles (such as as-spun fibers) of thermotropic liquid crystal polymers. Since the as-spun fibers are highly oriented along their longitudinal axis, the fibers are able to withstand much less stress along the transverse axis as opposed to along the longitudinal axis. Accordingly, the fibers break up length-wise into much narrower fibrils as they are masticated to form a pulp. Such articles are preferably masticated while in the form of an aqueous slurry. The term "masticating" as used herein is intended to include various mechanical processes such as grinding whereby the shaped article is subjected to crushing and/or shearing forces of sufficient magnitude to break up the shaped article into fibrils. Preferably, the shaped article is masticated for a sufficient period of time to ensure that a major portion of the fibrils (based on the number of fibrils present) are of submicron size (i.e., less than one micron in longest dimension).

The term "pulp" is intended to refer to a mass of fibers which have been mechanically masticated or ground, causing the fibers to separate, split, fray, fibrillate and/or shred into generally finer diameter units. The intertangling between the units, or "interfelting," is thereby enhanced, thus allowing the formation of thin, yet coherent sheets. The fibers and fragments may, in addition, become crimped, branched, or multiply bifurcated to improve the interfelting.

The grinding/masticating step required to produce the pulp may involve a series of techniques rater than just a single operation. The term "pulping" is herein used to collectively refer to the entire grinding/mastication operation employed in the production of pulp. The pulping is normally performed in a water slurry. A typical solids ratio during pulping is 0.05 to 5 percent by weight with the most preferred range being 0.5 to 2 percent by weight solids.

The fibrils which are produced commonly exhibit a ratio of length to diameter which is generally greater than that exhibited by the fibers. For example, the length to diameter ratio exhibited by the fibers generally ranges from about 30:1 to about 300:1, while the corresponding ratio for the fibrils ranges from about 50:1 to about 600:1. The fibrils preferably exhibit a diameter of about 0.5 micron to about 5 microns and a length of about 50 microns to about 3 millimeters.

The denier of the starting fibers typically ranges from 2 to 10 denier (i.e., 14 to 35 microns in diameter). However, fibers can be employed over a much broader size range, such as, for example, 0.5 to 100 denier (i.e., 7 to 100 microns in diameter). A typical starting length ranges from 1/32 to ¼ inch. If a starting length of greater than ⅛" is employed, the pulping method chosen should be capable of length reduction as well as fibrillation to avoid the possibility of clumping of pulp particles in the slurry.

Common pulping methods which may be employed include air fibrillation, or the use of a pulp refiner, open disk emulsifier, blender, grindstone, mill, Jordan or Valley pulp beater, or segmented impeller emulsifier. The use of surface wetting agents or 50 percent isopropanol or ethanol may facilitate the fibrillation of the polymer.

While the use of fibers is preferred, it is also possible to use articles of other shapes and configurations. For example, the polymer may also be in the form of pellets or sheets, etc. The term shaped article as used herein is intended to include particles, pellets, filaments, staple fibers, films, sheets and other extruded, molded, cast or otherwise formed shaped articles.

It should be noted, however, that the more highly oriented is the polymer in the article, the higher the aspect ratio of the fibrils which are formed will be. It is therefore preferable to employ articles in the method of the present invention which are highly oriented as a result of being formed (e.g., as spun fibers) so as to provide fibrils having a high aspect ratio.

The fibrils which are produced can subsequently be slurried with a liquid which is a non-solvent for the polymer of which the fibrils are comprised such as water and collected (e.g., filtered) onto a web or a screen to provide a random (i.e., multi-dimensional) array or sheet of fibrils. In additon to wet laying, webs may be formed by air lay processes wherein the fibrous material is entrained in and deposited from a moving air stream. With either type of formed web, appropriate methods can then be employed to bond the fibrils together to form an article such as paper. For example, the fibrils may be thermally bonded to one another at a temperature below the melting temperature of the liquid crystal polymer comprising the fibrils by conventional means such as heat pressing or calendering to at least bond the fibrils together at their cross-over points. Heat pressing is essentially a batch process wherein the web of fibrils is pressed between two heated plates. Calendering involves the passage of the fibrils in the form of a web between heated rolls. The use of a padded backup roll against a heated metal roll is preferred. The thermal bonding temperature will generally range from about 100° to about 250° C.

Alternatively, adhesives may be used to bond the fibrils. Suitable adhesives include but are not limited to the following: epoxies, thermosetting or thermoplastic resins such as thermosetting polyesters, water soluble adhesives such as casine, guar gum or polyacrylic acid, solvent-based adhesives and emulsion or latex based adhesives such as the styrene/butyl/acrylic copolymer systems.

The temperature as well as the method of thermal bonding employed affects the physical characteristics exhibited by the article which is produced. For example, when temperatures below about 140° C. are used, an opaque paper is provided. Such papers are essentially a mat of intertangled fibrous particulates (the fibrils) which exhibits substantial porosity and low density. On the other hand, when temperatures in excess of about 140° C. are employed in conjunction with a pressing or calendering step (and especially in the range of 170° C. or so), a transparent film or membrane resembling a glassine film is produced which exhibits minimal porosity. Accordingly, the use of excessively high temperatures and high pressure should generally be avoided if a paper of substantial porosity is desired since such temperatures and pressure increase the compaction and the degree of fusion of the fibrils to each other while correspondingly decreasing the porosity.

Articles comprised of the pulp of fibrils of the present invention possess many advantageous properties due to the presence of thermotropic liquid crystal polymers therein. Since the liquid crystal polymers are highly oriented, the fibrils which comprise the pulp of the present invention possess relatively high tensile strength and high modulus. Accordingly, articles comprised of the pulp similarly exhibit relatively high modulus and high tensile strength. In addition, the articles exhibit such tensile strength and modulus in a multi-dimensional manner due to the multi-dimensional (i.e., random) orientation of the fibrils within the article.

The mechanical properties of the fibrils contained in the pulp produced in accordance with the present invention can be improved still further by subjecting the fibrils to a heat treatment following formation thereof. The heat treatment improves the properties of the fibrils by increasing the molecular weight of the liquid crystalline polymer which comprises the fibrils and increasing the degree of crystallinity thereof while also increasing the melting temperature of the polymer. Such heat treatment can also serve to bond the fibrils together during formation of a non-woven article.

The fibrils may be thermally treated in an inert atmosphere (e.g., nitrogen, carbon dioxide, argon, helium) or alternatively, in a flowing oxygen-containing atmosphere (e.g., air). The use of a non-oxidizing substantially moisture-free atmosphere is preferred to avoid the possibility of thermal degradation. For instance, the fibrils may be brought to a temperature approximately 10 to 30 centigrade degrees below the melting temperature of the liquid crystal polymer, at which temperature the fibrils remain solid. It is preferable for the temperature of the heat treatment to be as high as possible without equaling or exceeding the melting temperature of the polymer. It is most preferable to gradually increase the temperature of heat treatment in accordance with the increase of the melting temperature of the polymer during heat treatment.

The duration of the heat treatment will commonly range from a few minutes to a number of days, e.g., from 0.5 to 200 hours, or more. Preferably, the heat treatment is conducted for a time of 1 to 48 hours and typically from about 5 to 30 hours.

Generally, the duration of heat treatment varies depending upon the heat treatment temperature; that is, a shorter treatment time is required as a higher treatment temperature is used. Thus, the duration of the heat treatment can be shortened for higher melting polymers, since higher heat treatment temperatures can be applied without melting the polymer.

Preferably, the heat treatment is conducted under conditions sufficient to increase the melting temperature of the polymer at least 10 centigrade degrees. Most preferably, the melting temperature of the liquid crystal polymer is increased from between about 20 to about 50 centigrade degrees as a result of the heat treatment. The amount of increase which is obtained is dependent upon the temperature used in the heat treatment, with higher heat treatment temperatures giving greater increases.

While advantages can be obtained by heat treating the fibrils prior to their incorporation into a non-woven article, it may be preferable to heat treat the fibrils subsequent to incorporation into the article since the thermal bonding and heat treatment steps can then be combined.

It should be noted at this time that reference herein to a temperature below which a specific polymer may exhibit anisotropic properties in the melt phase is intended to refer to the temperature below which the polymer exhibits such properties prior to heat treatment thereof.

The chemical resistance of the liquid crystal polymer also increases with the heat treatment and the solubility into pentafluorophenol, one of the rare solvents for these thermotropic liquid crystal polymers, continuously decreases with increasing heat treatment time such that eventually the polymer does not dissolving even minimally (such as in amounts of 0.1 percent by weight).

The physical characteristics of articles produced from the pulp of the present invention may be varied by the addition of various additives to the pulp in the web formation process. For example, wetting agents, surface treatment agents, coloring agents and fillers can be added. Such additives can include reinforcing fibers of various materials including thermotropic liquid crystal polymeric fibers.

The reinforcing fiber can be incorporated into the pulp over a wide range of proportions ranging from 0 to about 95 percent by weight or so. Dimensions of common reinforcing fibers range from 1 micron to 50 microns in diameter and from 1/32 to several inches in length, depending on the type of fiber and the physical characteristics desired in the final product. It is even possible to add continuous fiber.

The invention is additionally illustrated in connection with the following Examples which are to be considered as illustrative of the present invention. It should be understood, however, that the invention is not limited to the specific details of the Examples.

EXAMPLE 1

A polymer consisting of 30 mole percent of 6-hydroxy-2-naphthoic acid, 40 mole percent of 4-hydroxybenzoic acid, 10 mole percent of isophthalic acid, 5 mole percent of terephthalic acid and 15 mole percent of 2,6-dihydroxyanthraquinone was prepared from the following monomers:

| | |
|---|---|
| 6-acetoxy-2-naphthoic acid | 69.1 grams |
| 4-acetoxy benzoic acid | 72.1 grams |
| isophthalic acid | 16.61 grams |
| terephthalic acid | 8.31 grams |
| 2,6-diacetoxy-anthraquinone | 48.6 grams |

A one liter 3-necked flask (equipped with a glass paddle stirrer, nitrogen inlet and distillation head) was charged with the above monomers and evacuated and flushed with nitrogen three times. The flask was warmed via a sand bath to 250°. to initiate polymerization. The polymerization was conducted in a nitrogen atmosphere by programming the temperature to increase to 310° C. over a five hour period. Polymerization was continued under vacuum (0.7 torr) for an additional one-half hour, then allowed to cool to room temperature under nitrogen. The flask was broken to recover the polymer in the form of a solidified mass. The mass was broken up into small pieces by sawing. The pieces were then ground in a Wiley mill to a fluffy fibrillar material.

The polymer had an inherent viscosity of 1.47 when measured at a 0.1% w/N solution in pentafluorophenol. When examined by differential scanning colorimetry (scan rate of 20° C./minute), the glass transition temperature was found to be 120° C.

EXAMPLE 2

The following demonstrates the advantageous fibrillation properties of the polymers of the present invention. Fibers comprised of polyparaphenyleneterephthalate (Polymer A), a polymer consisting of 40 mole percent of 6-hydroxy-2-naphthoic acid and 60 mole percent of p-hydroxy benzoic acid (Polymer B) and a polymer of the present invention described in Example 1 (Polymer C) were masticated by use of an Ultrasonic Inc. sonicator, model W-375 with a Standard Microtip. Polymer B was masticated by pulsing the sonicator on a 50% cycle, while the remaining two were masticated at a continuous mode. The power output was the same for all runs.

The various pulps were masticated until fully fibrillated as evidenced by reduction of all particulates to fibrils. The Polymer A pulp took at least 60 minutes to fully fibrillate, the Polymer B pulp took at least 60 minutes to fully fibrillate, and the Polymer C pulp took less than 20 minutes to fibrillate to the same extent as the other two.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. An improved method of providing a pulp comprised of fibrils of a polymer which exhibits desirable thermal stability and chemical and solvent resistance comprising the steps of:
    providing a shaped article comprised of a polyester capable of forming an anisotropic melt phase which comprises not less than about 5 mole percent of recurring units which units comprise a 2,6-dioxyanthraquinone moiety; and
    masticating said shaped article to form a pulp comprised of fibrils of said polyester.

2. The method of claim 1 wherein said polyester comprises between about 5 and about 25 mole percent of said 2,6-dioxyanthraquinone moiety.

3. The method of claim 2 wherein said polyester comprises between about 5 and about 15 mole percent of said 2,6-dioxyanthraquinone moiety.

4. The method of claim 1 wherein said shaped article comprises a fiber.

5. The method of claim 1 wherein said shaped article comprises a pellet.

6. The method of claim 1 wherein shaped article is masticated while in the form of a slurry.

7. The method of claim 6 wherein said slurry is an aqueous slurry.

8. The method of claim 1 wherein said shaped article is masticated sufficiently such that a major portion of the fibrils which are produced are of submicron size.

9. The method of claim 1 wherein said polyester is a wholly aromatic polyester.

10. The method of claim 1 wherein said polyester comprises a melt processable wholly aromatic polyester which is capable of forming an anisotropic melt phase and consists essentially of the recurring moieties I, II, and III wherein:

I is

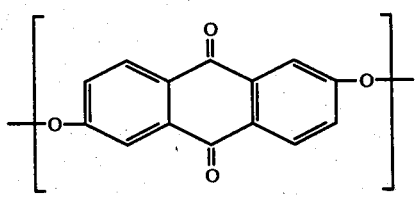

II is

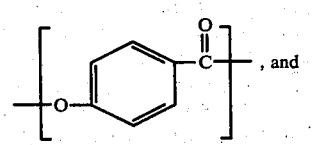, and

III is a dicarboxy aryl moiety of the formula

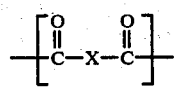

where X is selected from at least one member of the group consisting of
(a) 1,3-phenylene radicals which optionally are replaced with up to 75 mole percent of 1,4-phenylene radicals based upon the total concentration of 1,3-phenylene and 1,4-phenylene radicals present in the polyester, (b) 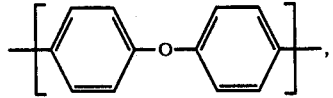, (c) 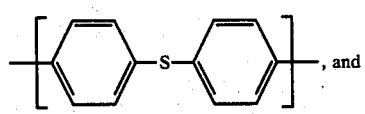, and (d) 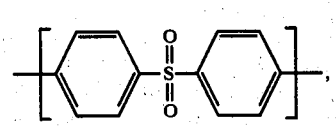, and wherein the polyester comprises approximately 15 to 30 mole percent of moiety I, approximately 35 to 70 mole percent of moiety II, and approximately 15 to 30 mole percent of moiety III, and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl and mixtures thereof.

11. The method of claim 1 wherein said polyester comprises a melt processable poly(ester-amide) capable of forming an anisotropic melt phase consisting essentially of recurring moieties I, II, III, and IV wherein:

I is

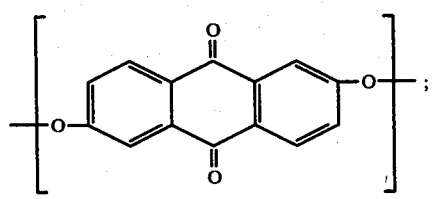

II is

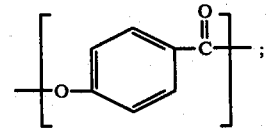;

III is

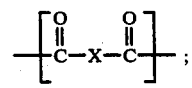;

where X is selected from at least one member of the group consisting of
(a) 1,3-phenylene radicals which optionally are replaced with up to 75 mole percent of 1,4-phenylene radicals based upon the total concentration of 1,3-phenylene and 1,4-phenylene radicals present in moiety III, (b) 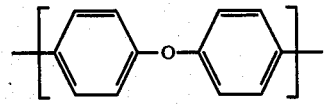, (c) 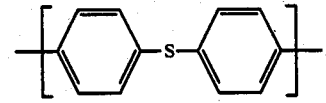, (d) 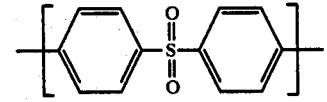, (e) 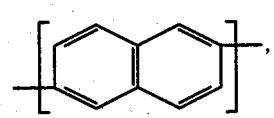, (f) 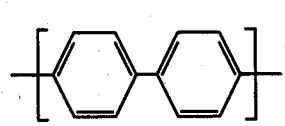, (g) 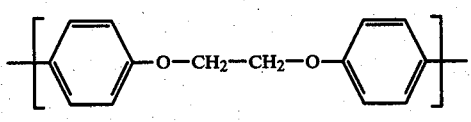, (h) a divalent aliphatic carbocyclic radical, and
(i) mixtures of the foregoing; and
IV is +Y—AR—Z+, where Ar is a divalent radical comprising at least one aromatic ring, Y is O, NH, or NR, and Z is NH or NR, where R is an alkyl group of 1 to 6 carbon atoms or an aryl group, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl and mixtures thereof, and wherein moiety I is present in a concentration within the range of approximately 5 to 35 mole percent, moiety II is present in a concentration within the range of approximately 20 to 80 mole percent, moiety III is present in a concentration within the range of approximately 10 to 40 mole percent, and moiety IV is present in a concentration within the range of approximately 5 to 35 mole percent, with the total molar concentration of moieties I and IV being substantially equal to the molar concentration of moiety III.

12. A pulp comprised of fibrils of a polyester which is capable of forming an anisotropic melt phase and which comprises not less than about 5 mole percent of recurring units which units comprise a 2,6-dioxyanthraquinone moiety.

13. The pulp of claim 12 wherein said polyester comprises between about 5 and about 25 mole percent of said 2,6-dioxyanthraquinone moiety.

14. The pulp of claim 13 wherein said polyester comprises between about 5 and about 15 mole percent of said 2,6-dioxyanthraquinone moiety.

15. The pulp of claim 12 wherein a major portion of the fibrils contained therein are of submicron size based on the number of fibrils present.

16. The method of claim 12 wherein said polyester is a wholly aromatic polyester.

17. The pulp of claim 12 wherein said polyester comprises a melt processable wholly aromatic polyester which is capable of forming an anisotropic melt phase and consists essentially of the recurring moieties, I, II and III wherein:

I is

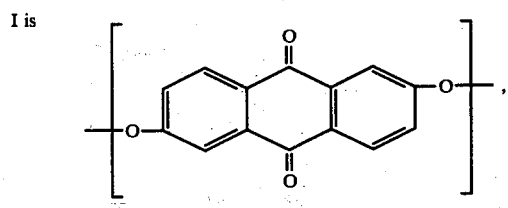

II is

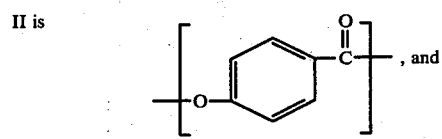, and

III is a dicarboxy aryl moiety of the formula

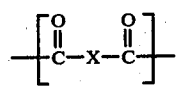

where X is selected from at least one member of the group consisting of
  (a) 1,3-phenylene radicals which optionally are replaced with up to 75 mole percent of 1,4 phenylene radicals based upon the total concentration of 1,3-phenylene and 1,4-phenylene radicals present in the polyester, (b) 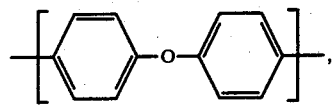

(c) 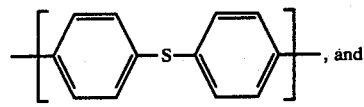, and (d) 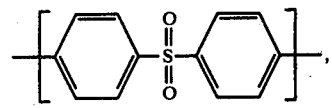, and wherein the polyester comprises approximately 15 to 30 mole percent of moiety I, approximately 35 to 70 mole percent of moiety II, and approximately 15 to 30 mole percent of moiety III, and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl and mixtures thereof.

18. The pulp of claim 12 wherein said polyester comprises a melt processable poly(ester-amide) capable of forming an anisotropic melt phase consisting essentially of recurring moieties, I, II, III, and IV wherein:

I is

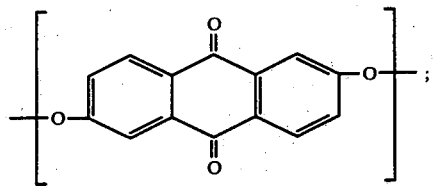

II is

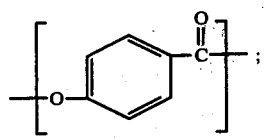

III is

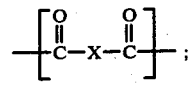

where X is selected from at least one member of the group consisting of
  (a) 1,3-phenylene radicals which optionally are replaced with up to 75 mole percent of 1,4-phenylene radicals based upon the total concentration of 1,3-phenylene and 1,4-phenylene radicals present in moiety III, (b) 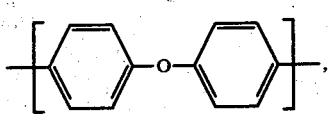

(c) 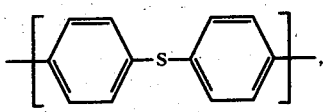,

-continued (d) 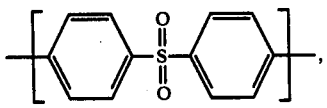

(e) 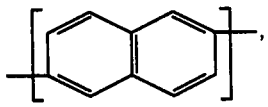

(f) 

-continued (g) 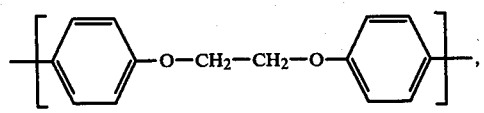

(h) a divalent aliphatic carbocyclic radical, and
(i) mixtures of the foregoing; and IV is a $-Y-Ar-Z-$, where Ar is a divalent radical comprising at least one aromatic ring, Y is O, NH, or NR, and Z is NH or NR, where R is an alkyl group of 1 to 6 carbon atoms or an aryl group, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof, and wherein moiety I is present in a concentration within the range of approximately 5 to 35 mole percent, moiety II is present in a concentration within the range of approximately 20 to 80 mole percent, moiety III is present in a concentration within the range of approximately 10 to 40 mole percent, and moiety IV is present in a concentration within the range of approximately 5 to 35 mole percent, with the total molar concentration of moieties I and IV being substantially equal to the molar concentration of moiety III.

* * * * *